United States Patent [19]

Fujimoto

[11] Patent Number: 4,975,861
[45] Date of Patent: Dec. 4, 1990

[54] COLOR CONVERSION IMAGE PROCESSING SYSTEM WITH MODIFIED INTENSITY INFORMATION CALCULATION

[75] Inventor: Yoshiji Fujimoto, Nara, Japan

[73] Assignee: Sharp Kabushiki Kaisha, Osaka, Japan

[21] Appl. No.: 235,902

[22] Filed: Aug. 24, 1988

[30] Foreign Application Priority Data

Aug. 24, 1987 [JP] Japan .................................. 62-209945

[51] Int. Cl.$^5$ ............................................. G06F 15/20
[52] U.S. Cl. ................................... 364/521; 340/703; 340/723; 364/518
[58] Field of Search ............................... 364/518–521; 340/701, 703, 721, 723, 798–800

[56] References Cited

U.S. PATENT DOCUMENTS

| | | | |
|---|---|---|---|
| 4,225,861 | 9/1980 | Langdon, Jr. et al. ............. | 340/703 |
| 4,484,187 | 11/1984 | Brown et al. ....................... | 340/703 |
| 4,631,690 | 12/1986 | Corthout et al. ................ | 364/521 X |
| 4,695,966 | 9/1987 | Takakura et al. .................. | 364/521 |
| 4,710,806 | 12/1987 | Iwai et al. ....................... | 364/521 X |

Primary Examiner—Dale M. Shaw
Assistant Examiner—H. R. Herndow

[57] ABSTRACT

An image processing system changes the color of a portion of an image to another color while maintaining the shades of the original image and which can also implement color changes between the three primary colors. The system utilizes a calculator which calculates modified intensity information from intensity information of color components read out from an image memory. The modified intensity information or the intensity information read out from the image memory is selected by a selector and fed to a look-up table memory through a gate. The look-up table memory converts the modified intensity information or the intensity information to converted intensity information in accordance with a predetermined function. A display displays an image on the basis of the converted intensity information outputted from the look-up table memory.

16 Claims, 12 Drawing Sheets

COLOR CONVERSION IMAGE PROCESSING SYSTEM WITH MODIFIED INTENSITY INFORMATION CALCULATION

BACKGROUND OF THE INVENTION

1. Field of the invention:

The present invention relates to an image processing system which can change the color of a desired area of an image to another color.

Figure 13:
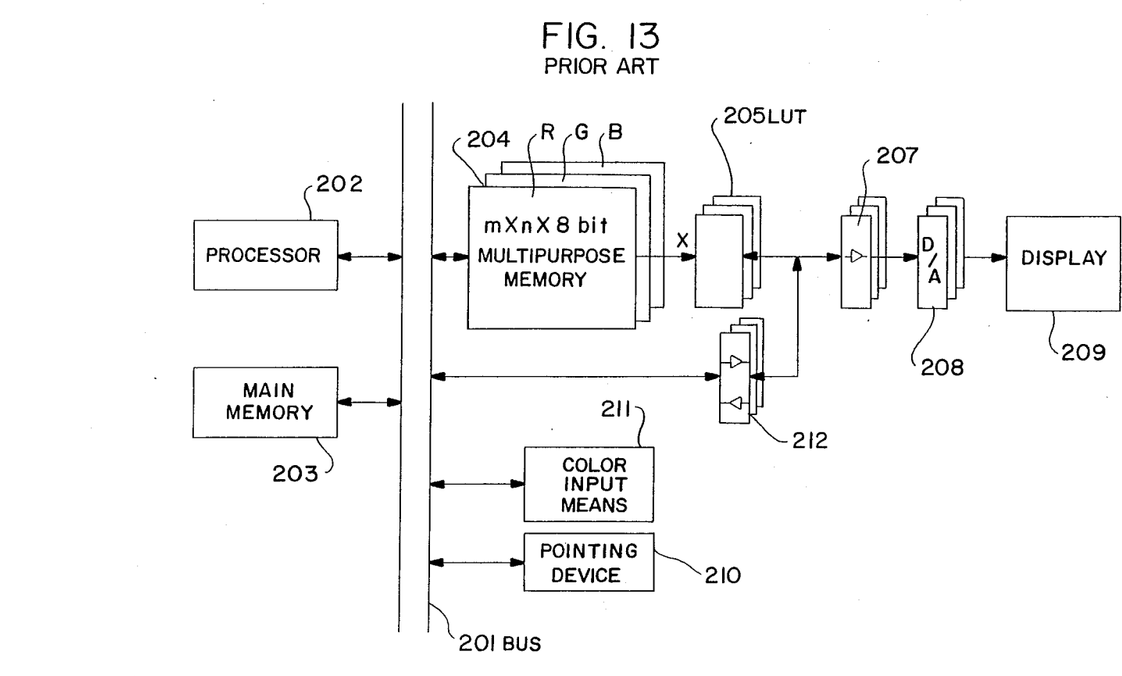
FIG. 13 is a block diagram showing a prior art image processing system.

2. Description of the prior art:

A color change is one of an image processing technique. For example, when the color of a green leaf in an image is to be changed to yellow, for example, only the area corresponding to the leaf is changed to yellow. This process can be made by replacing the data of R(Red), G(Green) and B(Blue) of each of the pixels forming the area with different data, respectively. Image processing systems which perform such a process are proposed in U.S. Pat. No. 4,878,178. FIG. 13 shows a block diagram of one example of the image processing systems. The system of FIG. 13 comprises a bus 201, a microprocessor 202 which conducts various controls, a main memory 203, a multipurpose memory 204 for storing image information and area information, a look-up table memory 205 for making a color change, a D/A converter 208 for converting digital image signals into analog image signals, a display 209 for visualizing the analog image signals, a pointing device 210 for designating the position of a reference color of the color change, and a color input means 211 for setting the target color of the color change.

Figure 14:
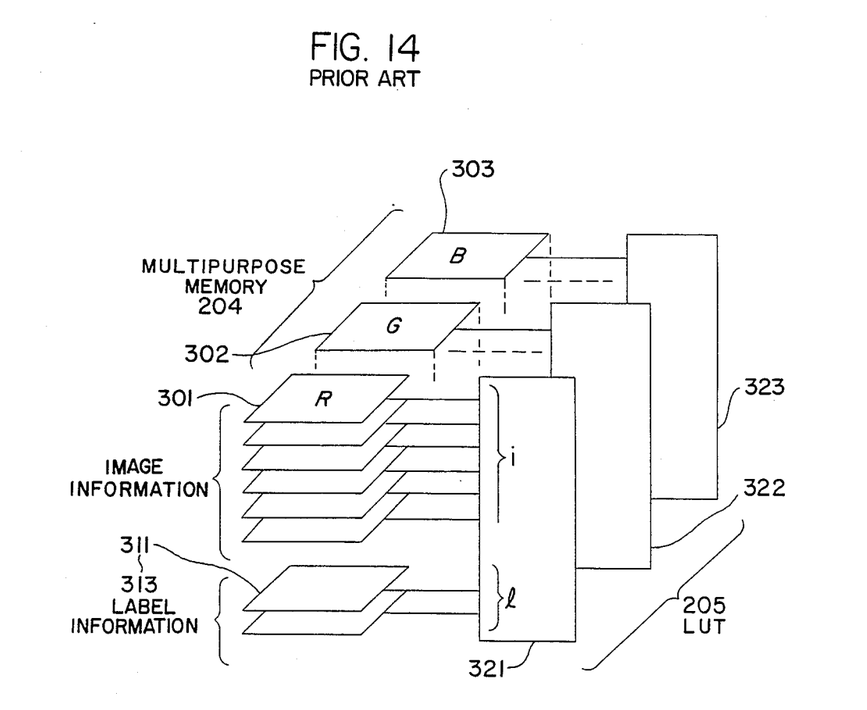
FIG. 14 is a diagrammatic view illustrating the contents of the multipurpose memory and the look-up table memory used in the system of FIG. 13.

The multipurpose memory 204 and look-up table memory 205, which are the most important parts of the image processing system, are diagrammatically shown in FIG. 14. An image inputted from a television camera or scanner is color-separated into three color components of R(Red), G(Green), and B(Blue). The multipurpose memory 204 comprises image information memory regions 301, 302 and 303 each of which stores intensity information of the respective color component, and label information memory sections 311, 312 and 313 for storing labels which will be utilized in distinguishing areas wherein color is to be changed. The look-up table memory 205 comprises transform table memories 321, 322 and 323 corresponding to each color component. In the look-up table memory 205, the intensity information and label information of each of the color components R, G, B which are read out from the multipurpose memory 204 are used as addresses when the contents of the look-up table memory 205 are read out. A function of one variable for conducting the color change is supplied through the gate 212 to the look-up table memory 205 to be stored therein. The contents of the look-up table memory 205 are supplied via the gate 207 as intensity information of each of the three color components R, G, B to the D/A converter 208 to be converted into analog signals which are then displayed as an image by the display 209.

In the multipurpose memory 204, the most significant 6 bits are assigned to the image information and the least significant 2 bits are assigned to the label information of the area. When one of the color components R, G, B is represented by k, the k component (k=r, g or b) of the multipurpose memory 204 consists of the intensity information Ik ($0 \leq Ik < 2^6$) and the label information l ($0 \leq l < 2^2$). Accordingly, the output x of the multipurpose memory 204 is shown as follows: $x = 2^2 \times Ik + l$.

When the color change is to be performed, the look-up table memory 205 is set in the following manner. The output x of the multipurpose memory 204 is inputted into the look-up table memory 205. The output fk(x) of the k component from the look-up table memory 205 becomes as follows:

$fk(x) = fk^{(0)}(x)$ (when x mod $2^2 = 0$), $fk(x) = fk^{(1)}(x)$ (when x mod $2^2 = 1$), $fk(x) = fk^{(2)}(x)$ (when x mod $2^2 = 2$), $fk(x) = fk^{(3)}(x)$ (when x mod $2^2 = 3$).

The function $fk^{(l')}(x)$ (wherein $l' = 0, 1, 2, 3$) is a function which determines the color of each of the areas corresponding to the label information which is 0, 1, 2 or 3. Accordingly, a change of the function $fk^{(l')}(x)$ corresponding to each of the labels enables an individual color change of each of the areas.

Figure 15A:
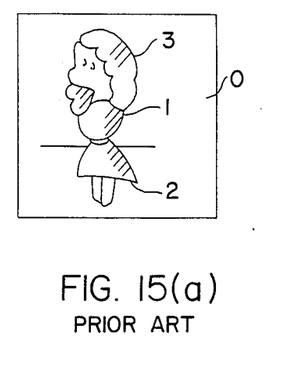
FIGS. 15(a) and 15(b) are diagrams illustrating a labeled full color image and a manner of designating the target color by a cursor, respectively.
Figure 15B:
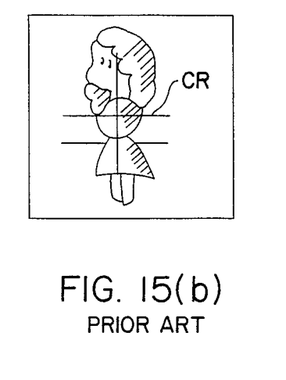

FIG. 15(a) shows an example of a full color image to which four kinds of label information 0, 1, 2 and 3 have been inputted. The color of an area is changed as follows:

(A) The program enters the reference color input mode via a mode selection means. Under the reference color input mode, a point of the area in which the color is to be changed is designated on the image, and then the intensity information Ir, Ig, Ib of the color of the point and also the label information lo of the point are inputted using the pointing device 210. FIG. 15(b) illustrates the input process of the reference color in which a cursor CR is moved in response to the output of the pointing device 210.

(B) The program enters a target color input mode via the mode selection means. In this mode, a color to which the color of the point designated in the reference color input mode is to be changed is inputted through the color input means 211. Hereinafter, such a color is referred to as "a target color". The target color is defined by Dk (Dr, Dg, Db). The target color can be inputted by various methods, for example, by displaying a pallet on the display to select a color therefrom, by inputting color components as numeric data, or by modifying a displayed graph which indicates color components.

(C) The contents of the look-up table memory 205 are changed in the following manner. Since the label information lo of the area in which the color is to be changed has been obtained through the operation described in (A), The function $fk^{(lo)}(x)$ which corresponds to the label information lo is changed as follows:

$$fk^{(lo)}(x) = \left[ \frac{Dk \times i}{Ik} \right] (0 \leq i < Ik)$$
$$= Dk \qquad (i = Ik)$$
$$= F \times \frac{i - Ik}{2^6 - Ik} + Dk \times \frac{2^6 - i}{2^6 - Ik}$$
$$(Ik < i \leq 2^6)$$

In the above, the symbol i indicates a quotient obtained by dividing the input x by $2^2$ (i.e., the intensity information), the symbol [ ] is the Gaussian symbol, and the symbol F is the upper limit of the output of the look-up table memory 205.

Figure 16A:
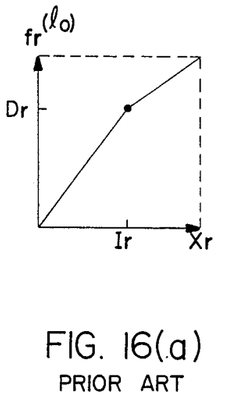
FIGS. 16(a) to 16(c) are graphs of the functions of the look-up tables used in the system of FIG. 13.
Figure 16B:
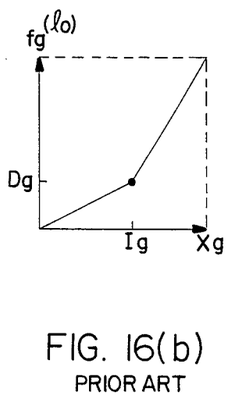
Figure 16C:
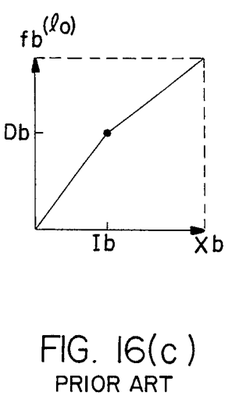

FIGS. 16(a), 16(b) and 16(c) show the configuration of the functions $fk^{(lo)}(x)$ (k=r, g, b) obtained in the above.

By setting the function $fk^{(lo)}(x)$ in this way, the area corresponding to the label information lo is changed in color and displayed as described below. First, the coordinate point designated in (A) and having the information of the reference color is displayed in the target color. Points having a color intensity higher than that of the reference color are displayed in a color brighter than the target color, and points having a color intensity lower than that of the reference color are displayed in a color darker than the target color. Thus, any color of a full-color image can be readily and rapidly changed only by inputting coordinate information which designates the reference color and by inputting color information which designates the target color.

In the above-described system, the components of the colors R, G, B are independently changed. When a specific color is changed to another specific color, shades which have been included in the original image disappear, or the intensity changes suddenly to produce a boundary line in a portion wherein the intensity has varied gradually and continuously so as to produce no boundary line. This problem will be described in more detail.

Figure 17A:
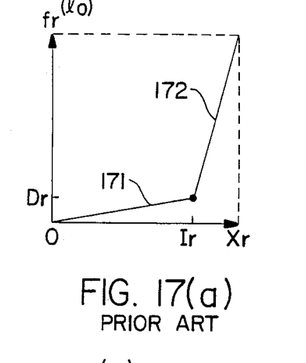
FIGS. 17(a) to 17(c), 19(a) to 19(c), 20(a) to 20(c) and 21(a) to 21(c) are graphs of the functions of other look-up tables used in the system of FIG. 13.
Figure 17B:
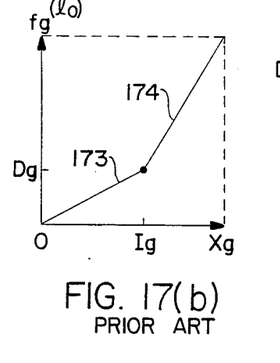
Figure 17C:
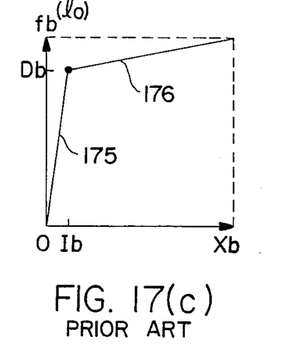

If all components of both the reference color Ik (Ir, Ig, Ib) and the target color Dk (Dr, Dg, Db) are not almost equal to an extreme value (i.e., the lower limit of 0 or the upper limit of $2^n$ (n is a bit number) as shown in FIG. 16, the color change can be conducted smoothly without causing the above-mentioned problem. For example, when a color having shades of orange is changed to a greenish blue as shown in FIG. 17, the R component Ir of the reference color is near the upper limit, and the B component Ib is near the lower limit, while the R component Dr of the target color is near the lower limit, and the B component Db is near the upper limit. In this case, the portion 171 in FIG. 17(a) and portion 176 in FIG. 17(c) incline at a small angle so that the color changes gradually. By contrast, the portion 172 in FIG. 17(a) and portion 175 in FIG. 17(c) incline at a very large angle so that the intensity output cf the respective color component is changed to a large degree by a small change of the intensity input. This will be easily understood from FIG. 18 which is an enlarged view of the graph shown in FIG. 17(c).

Figure 18:
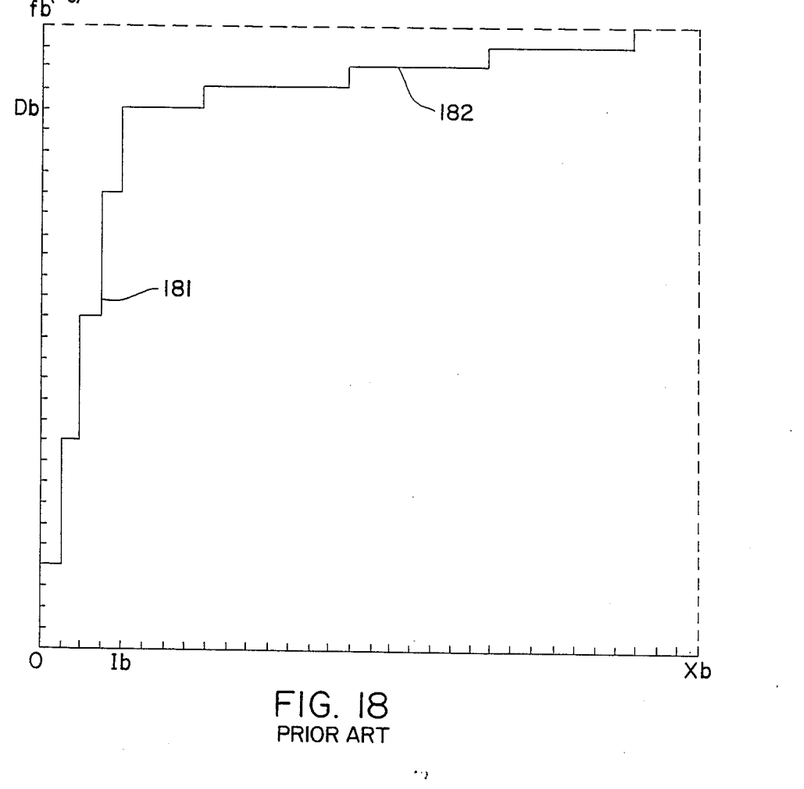
FIG. 18 is a enlarged view of the graph of FIG. 17(c).

Both the input Xb and output $fb^{(lo)}(x)$ are discrete values which are coded in binary form (in FIG. 18, they are expressed by a 5-bit binary number). Therefore, in response to a small change of the input Xb in the steep slope portion 181, the output $fb^{(lo)}(x)$ changes greatly in a stair-like manner so that many boundary lines, which resemble contour lines in a map appear in the area wherein the intensity has varied continuously. On the other hand, the value of the output $fb^{(lo)}(x)$ changes very slightly in response to a change of the input Xb in the gentle slope portion 182 so that the shades appearing in the original image disappear, resulting in the image which seems to be painted over with one color.

Figure 19A:
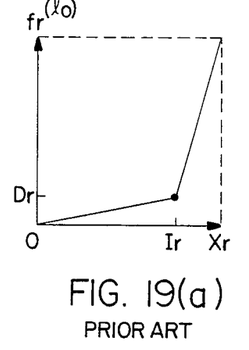
Figure 19B:
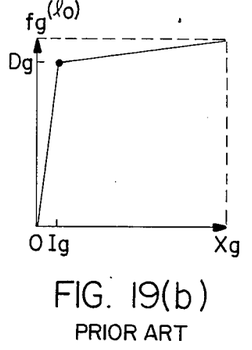
Figure 19C:
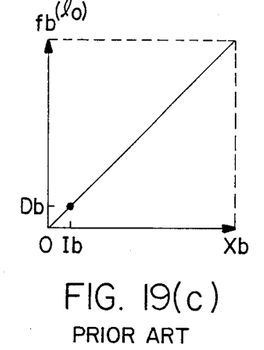

When an image which consists mainly of one primary color (e.g., red) is to be changed to one which consists almost entirely of another primary color (e.g., green) as shown in FIG. 19, the G component in the image changes little in response to the variation of the R component in the image. Therefore, in the resulting image, there appear many boundary lines which resemble contour lines, or the resulting image appears to be painted over with green. In an extreme case that an image consisting of red only (i.e., the image has the R component alone and has substantially no G and B components) is to be changed to an image consisting of green only, the intensity information possessed by the R component cannot be transferred to the G component. Namely, in a prior art image processing system, a color change between the three primary colors can not be conducted.

Figure 20A:
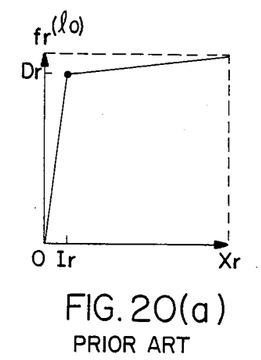
Figure 20B:
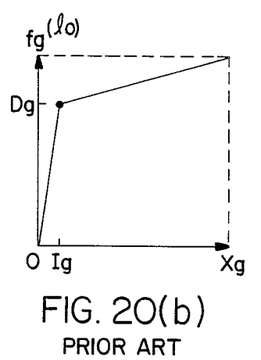
Figure 20C:
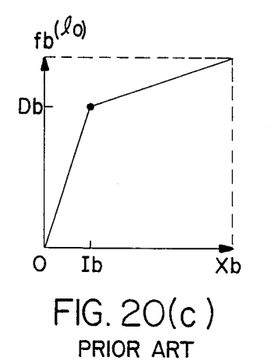
Figure 21A:
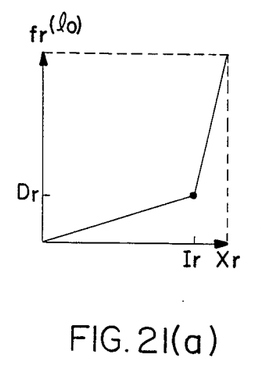
Figure 21B:
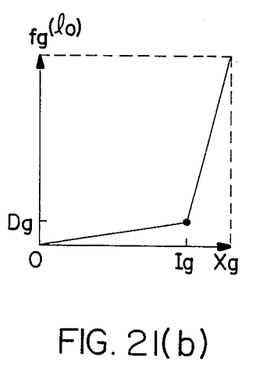
Figure 21C:
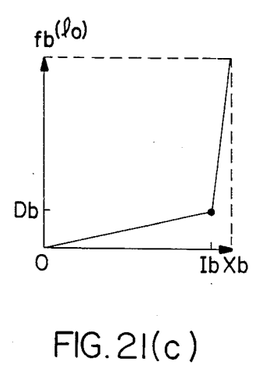

In a prior art system, a similar problem which is caused by the discrete values in the look-up table memory arises when an image having a very dark color is to be changed to one having a very bright color as shown in FIG. 20, or when an image having a very bright color is to be changed to one having a very dark color as shown in FIG. 21.

SUMMARY OF THE INVENTION

The image processing system of this invention, which overcomes the above-discussed and numerous other disadvantages and deficiencies of the prior art, comprises an image memory means for storing intensity information of color components of portions constituting an image; a look-up table memory means which receives the intensity information of color components of a portion in which color is to be changed, converts said intensity information, and outputs said converted intensity information; and a display means for displaying an image on the basis of said intensity information outputted from said look-up table memory means, the system further comprises: a calculating means which calculates modified intensity information from intensity information of two or more color components of said portion; a selecting means for selecting said modified intensity information to be inputted into said look-up table memory means, or said intensity information to be inputted into said look-up table memory means; and a gate means for supplying said modified intensity information or said intensity information to said look-up table memory means in accordance with the output of said selecting means.

In a preferred embodiment, the selecting means selects said modified intensity information in the case that the absolute value of the differential coefficient of a function in said look-up table memory means is less than a first threshold which is close to zero, or greater than a second threshold which is greater than said first threshold, and selects said intensity information of color components in another case.

In a preferred embodiment, the modified intensity information is a mean value of the three color components of said portion.

In a preferred embodiment, the modified intensity information is a mean value of two color components of said portion.

In a preferred embodiment, the modified intensity information is equal to a luminance signal in the National Television System Committee or NTSC system.

In a preferred embodiment, the calculating means calculates further-modified intensity information from said modified intensity information when said modified intensity information is close to the lower limit or upper limit of the intensity range of said look-up table memory means.

In a preferred embodiment, the further-modified intensity information is obtained by subtracting a predetermined value from said modified intensity information and then multiplying said subtracted modified intensity information by a fixed value which is greater than one.

Thus, the invention described herein makes possible the objectives of (1) providing an image processing system which can conduct a color change while exactly maintaining the shades of the original image and (2) providing an image processing system which can conduct a color change between the three primary colors.

BRIEF DESCRIPTION OF THE DRAWINGS

This invention may be better understood and its numerous objects and advantages will become apparent to those skilled in the art by reference to the accompanying drawings of illustration only, and are thus not limitative of the present invention and wherein.

DESCRIPTION OF THE PREFERRED EMBODIMENTS

First Example

A first example of the image processing system according to the invention will be described with reference to FIGS. 1 to 4. In this example, either of the R, G, B components or the mean value of the R, G, B components is selected to be inputted to a look-up table memory, thereby enabling a smooth color change while maintaining the shades of the original image.

The aforementioned problem of a prior art system which is basically caused by the discrete values in a look-up table occurs when one color component Ik of the reference color is close to the lower limit (0) and the corresponding color component Dk of the target color is close to the upper limit ($2^n - 1$ in the case that the image information in the multipurpose memory is expressed in the form of n-bit data), or when one color component Ik of the reference color is close to the upper limit and the corresponding color component Dk of the target color is close to the lower limit. The color components of the target color cannot be modified. The aforementioned problem will be overcome by changing the color components of the reference color to be substantially different from that of the lower limit or upper limit. In this example, the mean value $Xa = (Xr + Xg + Xb)/3$ of the three color components is used as a coordinate input, and the mean value $Ia = (Ir + Ig + Ib)/3$ of the three color components is used instead of the color component Ik of the reference color.

By using the mean value Ia instead of the R and B components Ir and Ib shown in FIG. 17, the contents of the look-up table memory can be modified as shown in FIG. 3. The portions 511 and 503 which respectively correspond to the portions 172 and 175 in FIG. 17 incline with a small angle so that the step widths of the discrete values in the look-up table memory become small, resulting in improved accuracy of the color change. If the input Xr, Xg, Xb of each look-up table and the reference color Ir, Ig, Ib are of the same color respectively (namely, the hue and saturation are substantially the same respectively) and are different in intensity, each input Xr, Xg, Xb changes in proportion to the intensity. Hence, the mean value $Xa = (Xr + Xg + Xb)/3$ of the inputted three color components also changes in proportion to the intensity. When the slope of the function in the look-up table memory is steep, therefore, a smooth color change in which the relation among the shades is preserved can be conducted by selecting the mean value Xa as the input of the look-up tables.

By using the mean value Xa as the R and G components in FIG. 19, the look-up tables shown in FIG. 4 can be obtained. In each of these look-up tables, the slope of the function is gentle so that the problem which has been caused by the discrete values can be eliminated.

An example of the way of determining the condition for selecting the above-described mean value of the three color components will be described. When the color component of the reference color is Ik, the color component of the questioned color is Dk, the upper limit of the color component of the reference color is Fi, and the upper limit of the color component of the questioned color is Fd, the condition can be obtained from the following inequalities:

$$Dk/Ik > T1 \text{ or } Fd - Dk/(Fi - Ik) > T1$$

or $$Dk/Ik < T2 \text{ or } Fd - Dk/(Fi - Ik) < T2 \qquad (1)$$

wherein T1 is a large threshold value and T2 is a small threshold value which nearly equals zero. The threshold values T1 and T2 may be determined in accordance with the desired level of the quantization accuracy. The threshold values T1 and T2 may be determined experimentally using the maximum values Fi and Fd as standard values, for example, on the criteria whether or not the above-mentioned problem occurs.

Figure 1:
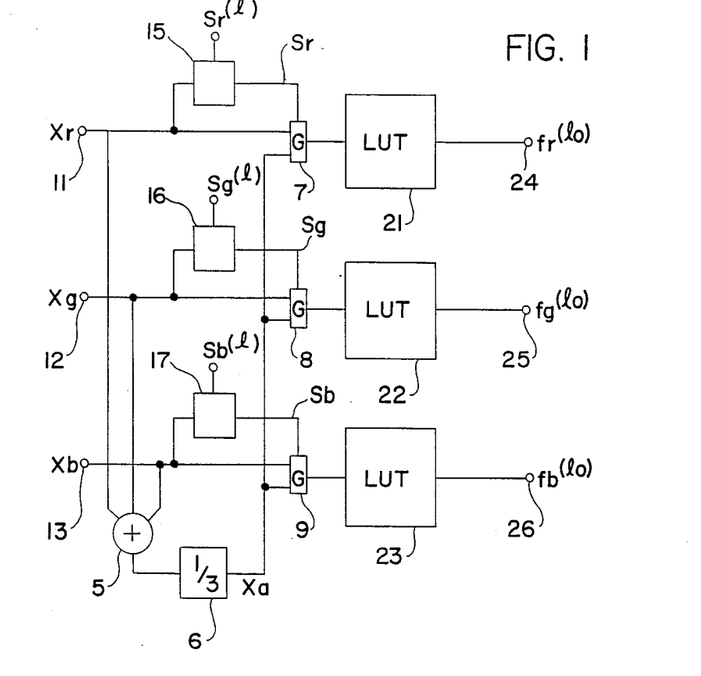
FIG. 1 is a block diagram showing a first embodiment of the image processing system according the invention.

FIG. 1 illustrates an example of the hardware for performing the above procedures. The inputs Xr, Xg, Xb (the R, G, B color components) supplied through terminals 11 to 13 are added by an adder 5. The output of the adder 5 is supplied to a ⅓ divider 6 to obtain the mean value Xa of the three primary color inputs. Gates 7, 8 and 9 respectively receive control signals Sr, Sg and Sb from selection circuits 15, 16 and 17. In accordance with the control signals Sr, Sg and Sb, the gates 7, 8 and 9 select either of the color component inputs or the mean value Xa.

Figure 2:
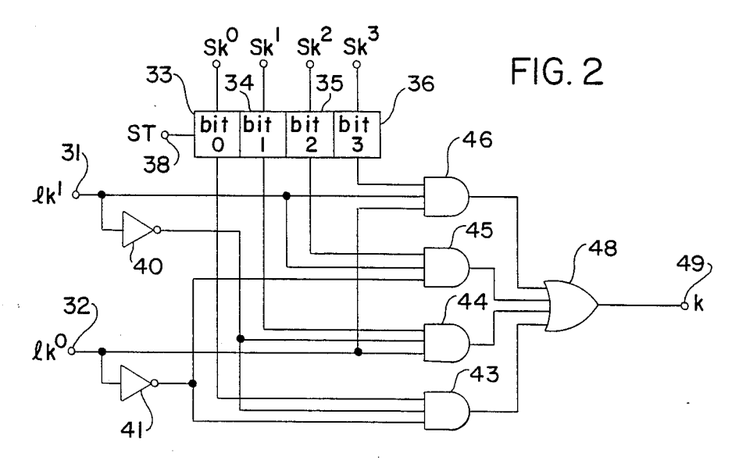
FIG. 2 illustrates the selection circuit used in the embodiment of FIG. 1.
Figure 3A:
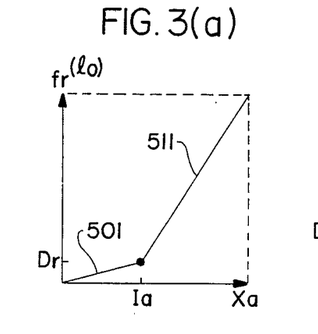
FIGS. 3(a) to 3(c) and 4(a) to 4(c) are graphs of the functions of the look-up tables used in the embodiment of FIG. 1.
Figures 3B, 3C:
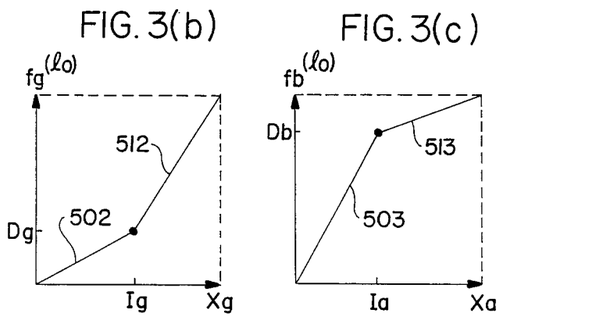
Figure 4A:
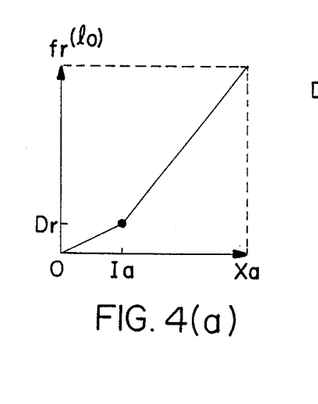
Figures 4B, 4C:
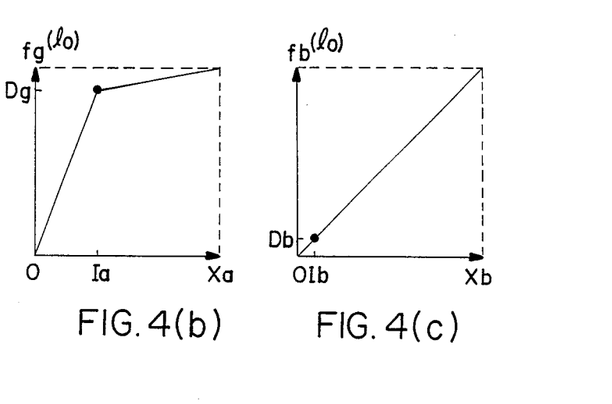

An example of the selection circuits 15, 16 and 17 is shown in FIG. 2. The signals of the label information 311 of the multipurpose memory shown in FIG. 14 are supplied to input terminals 31 and 32 as input signals $lk^1$ and $lk^0$. The microprocessor 202 (FIG. 13) determines the contents of the look-up table which correspond to the label l of each color component k, from the inequalities (1). When the mean value Xa is to be used, the microprocessor 202 sets the bit of signal $Sk^{(l)}$ to "1". When the inputted color components are to be used, the microprocessor 202 sets the bit of signal $Sk^l$ to "0". The signal $Sk^{(l)}$ is written into registers 33 to 36 through the bus 201, using strobe signal ST supplied to a terminal 38 as a trigger signal. In the selection circuits 15 to 17, inverters 40 and 41, AND gates 43 to 46, and an OR gate 48 constitute a selector. The bit of the registers 33 to 36 which is expressed by the label signals $lk^1$ and $lk^0$ is outputted through a terminal 49 as a control signal Sk. When the bit indicated by the label signals of the registers 33 to 36 is "1", the control signal Sk appearing at the terminal 49 becomes "1" to select the mean value Xa of the three color components.

The microprocessor 202, which also functions as a rewriting means, conducts a judgment in accordance with the inequalities (1), and rewrites the look-up tables via the gate 212 (FIG. 13) so that the contents of the look-up tables will be changed in advance as shown in FIGS. 3 and 4. The signals passing through the gates 7 to 9 are supplied as address signals to look-up tables 21 to 23. The contents of the look-up tables 21 to 23 are read out to be supplied as the outputs $fr^{(lo)}$, $fg^{(lo)}$, $fb^{(lo)}$ through terminals 24 to 26.

Second Example

Figure 5:
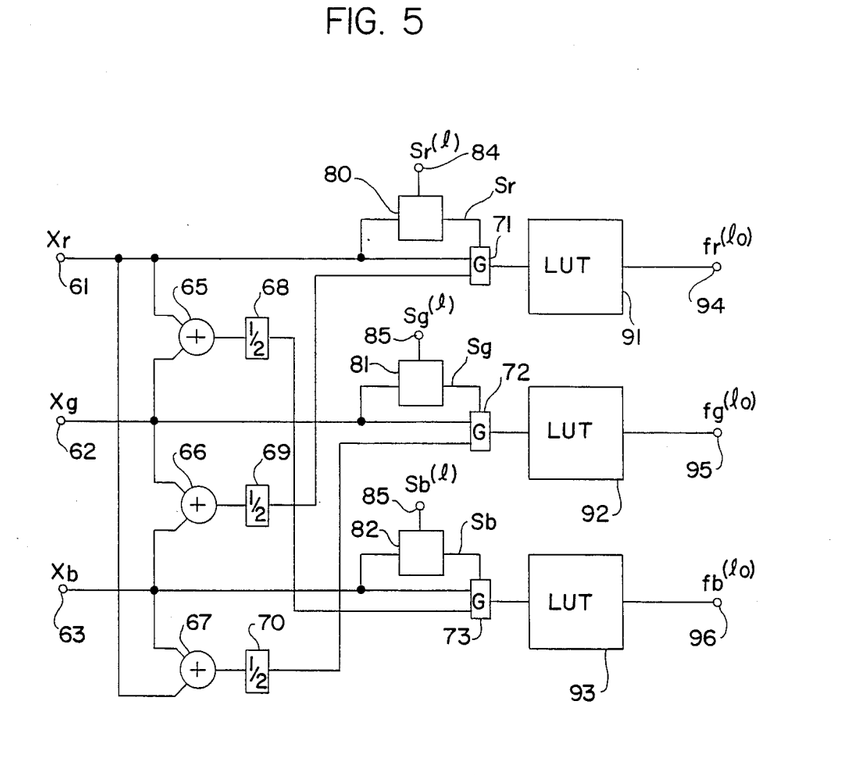
FIG. 5 is a block diagram showing a second embodiment of the image processing system according the invention.

FIG. 5 illustrates a second example of the image processing system according to this invention. In this example, a mean value of each combination of two color components (R and G components, G and B components, and B and R components) is calculated, and either of the R, G, B components or the mean value of the two color components other than the questioned color component is selected to be inputted into look-up tables for the questioned color component, thereby enabling a smooth color change while maintaining the shades of the original image.

Figure 6A:
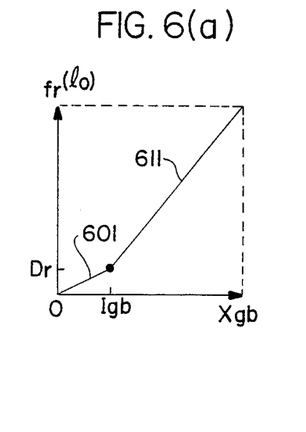
FIGS. 6(a) to 6(c) and 7(a) to 7(c) are graphs of the functions of the look-up tables used in the embodiment of FIG. 5.
Figure 6B:
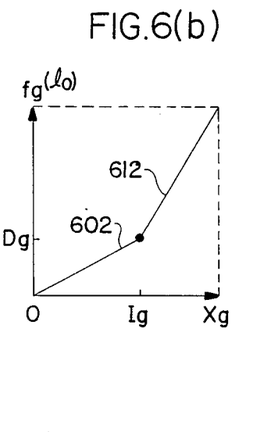
Figure 6C:
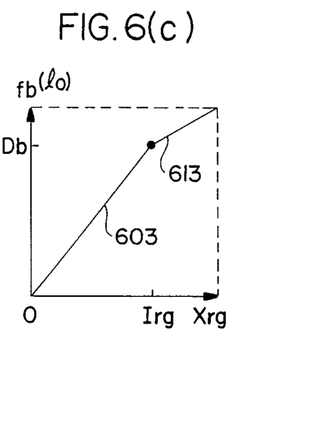

When the slope of the look-up table for one color component is steep, the mean value of the two color components other than this color component is selected in accordance with the inequalities (1). When the color change illustrated in FIG. 17 is to be conducted, for example, the mean value Xgb of the G and B components is inputted to the look-up table for the R component, and the mean value Xrg of the R and G components is inputted to the look-up table for the B component. FIG. 6 shows the resulting look-up table for each color component. In the resulting look-up tables, the steep portions 172 and 175 in FIG. 17 are changed to the gentle portions 611 and 603 so that the problem which is caused by the discrete values in the tables can be overcome. When the color change from red to blue (FIG. 19) is to be conducted, the mean value Xgb of the G and B components is inputted to the look-up table for the R component, and the mean value Xbr of the B and R components is inputted to the look-up table for the G component, thereby enabling a smooth color change while maintaining the shades of the original image.

FIG. 5 illustrates an example of the hardware for performing the above-mentioned processes which comprises adders 65, 66 and 67, and ½ dividers 68, 69 and 70. Each combination of the color components Xr, Xg, Xb inputted to terminals 61 to 63 is supplied to one combination of the adders 65 to 67 and ½ dividers 63 to 70 to obtain the mean values Xrg, Xgb, Xbr.

Gates 71, 72 and 73 are controlled by control signals Sr, Sg and Sb, respectively, to select either of the R, G, B components or the mean value of the two color components other than the questioned color component. The control signals Sr, Sg and Sb are supplied from selection circuits 80, 81 and 82 in the same manner in the first example. When a color component satisfies the inequalities (1), the microprocessor 202 (FIG. 13) produces a corresponding control signal $Sr^{(l)}$, $Sg^{(l)}$ or $Sb^{(l)}$ which is supplied to the selection circuit 80, 81 or 82 via a terminal 84, 85 or 86.

Figure 7A:
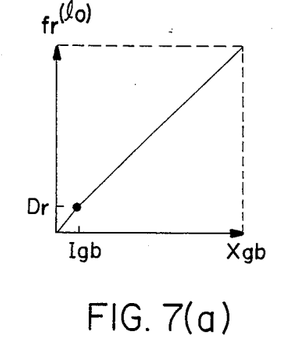
Figure 7B:
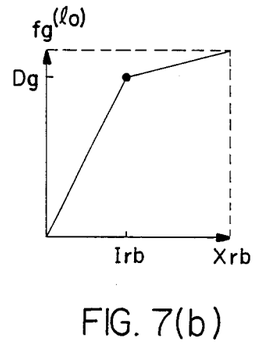
Figure 7C:
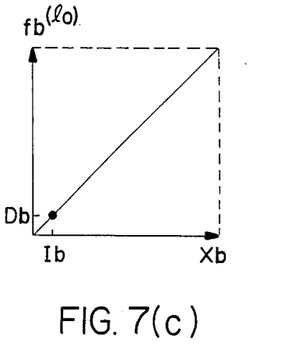

According to this example, the contents of the look-up table are modified as shown in FIG. 6 or 7. The signals passing through the gates 71 to 73 are supplied as address signals to look-up tables 91 to 93. The contents of the look-up tables 91 to 93 are read out to be supplied as the outputs $fr^{(lo)}$, $fg^{(lo)}$, $fb^{(lo)}$ through terminals 94 to 96.

Third Example

Figure 8:
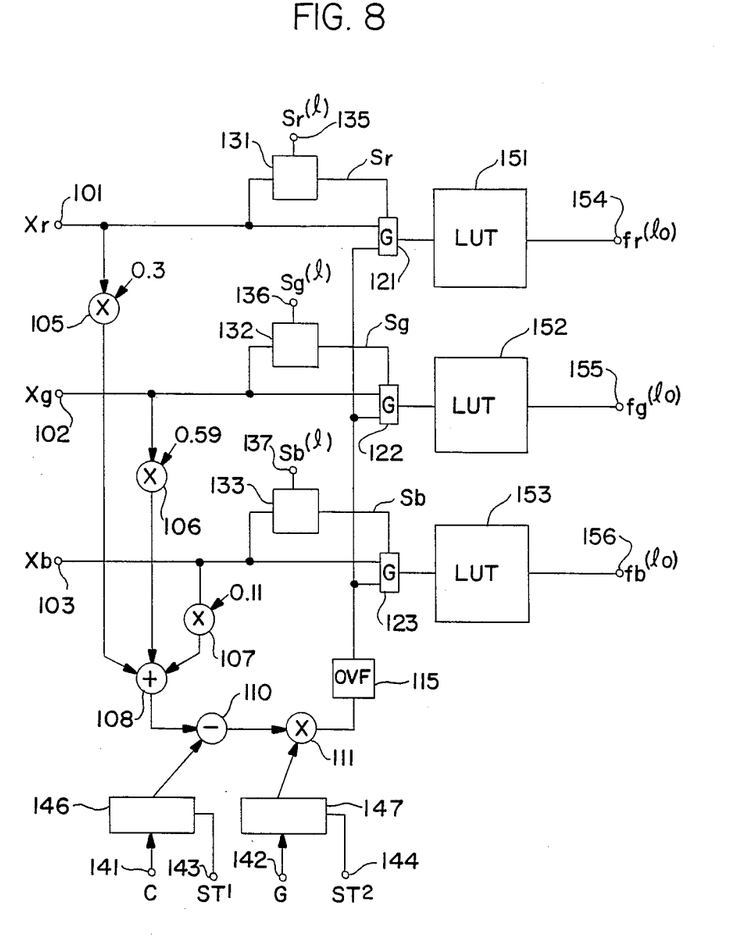
FIG. 8 is a block diagram showing a third embodiment of the image processing system according the invention.

FIG. 8 illustrates a third example of the image processing system according to this invention. While the first example employs the mean value of the three color components, the third example employs a luminance signal Xy used in the NTSC television system. The luminance signal Xy is expressed by the following equation:

$$Xy = 0.30Xr + 0.59Xg + 0.11Xb \quad (2)$$

The luminance signal may be more suitable as an intensity signal than a mere mean value of the color components. Particularly, the luminance signal Xy can be used as an input signal for all look-up tables, when the color difference signals of NTSC system are substantially the same with regard to the color to be changed.

In the third example, a scale factor for adjusting the scale of the luminance signal will be necessary since the luminance signal itself has a value close to the upper or lower limit when a dark color is to be changed to a bright color (FIG. 20) or when a bright color is to be changed to a dark color (FIG. 21).

When the luminance signal Iy of the reference color is close to the lowest value (i.e., 0), the luminance signal Xy is amplified as follows:

$$X'y = Xy \times G \text{ (wherein } G > 1) \quad (3)$$

so that a scale-adjusted signal I'y (I'y = Iy × G) having a larger value can be obtained. In this case, it is preferable to set the gain G to be Fi/(2×Iy) so that I'y (=Iy×G) equals Fi/2. When the scale-adjusted luminance signal X'y becomes larger than the upper limit Fd, it will be required to readjust the luminance signal to be Fd (i.e., X'y=Fd). Alternatively, the maximum value (max{Xy}) of the luminance signal Xy may be detected before setting the gain G, and thereafter the gain G is set so as to satisfy the following inequality:

$$\max\{Xy\} \times G \leq Fd.$$

It seems that the most preferable value of the gain G can be calculated from the following:

$$G = \min\left\{\frac{Fd}{\max\{X_y\}} \cdot \frac{Fi}{2I_y}\right\} \quad (4)$$

When the luminance signal Iy of the reference color is close to the upper limit Fi, measures should be taken so that the scale-adjusted luminance signal X'y is smaller than the upper limit Fi. For example, a fixed value C is subtracted from the luminance signal Xy before amplifying the luminance signal Xy. Namely, the scale-adjusted luminance signsal X'y can be calculated from the following equation:

$$X'y = (Xy - C) \times G \quad (5)$$

In the equation, (Fi−C)×G equals Fi, namely $$G = Fi/(Fi - C) \quad (6)$$

It is preferable to set the constant C to the value calculated by the following:

$$C = Fi - (Fi - Iy) \times 2 - 2Iy - Fi \quad (7)$$

because the scale-adjusted luminance signal I'y of the reference color becomes the middle value, i.e. Fi/2. When the scale-adjusted luminance signal X'y becomes negative, it will be required to readjust the luminance signal to be zero (i.e., X'y=0). Alternatively, the minimum value (min{Xy}) of the luminance signal Xy may be detected prior to the setting of the constant C, and thereafter the fixed value C is set to be min{Xy} (i.e., C=min{Xy}). It appears that the most preferable value of the fixed value C can be calculated from the following:

$$C = \min\{2Iy - Fi, \min\{Xy\}\} \quad (8)$$

Figure 9A:
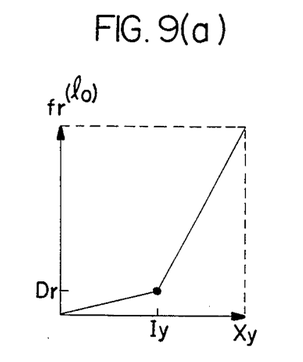
FIGS. 9(a) to 9(c), 10(a) to 10(c), 11(a) to 11(c) and 12(a) to 12(c) are graphs of the functions of the look-up tables used in the embodiment of FIG. 8.
Figure 9B:
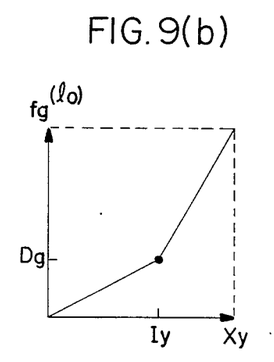
Figure 9C:
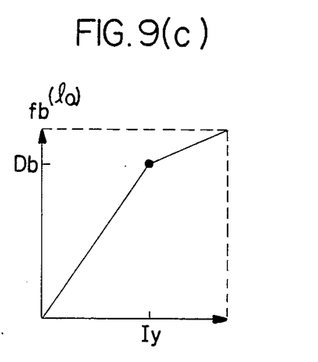
Figure 10A:
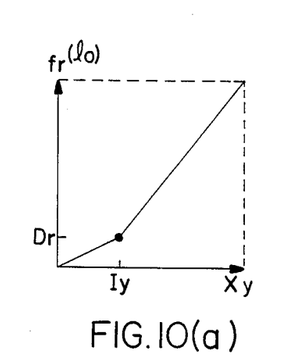
Figure 10B:
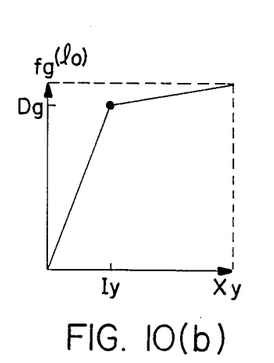
Figure 10C:
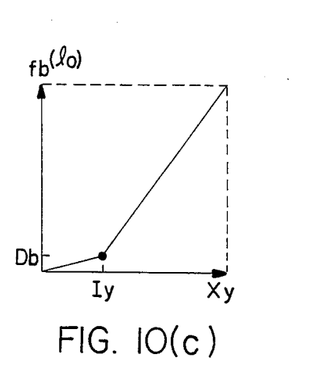

According to the third example, the look-up tables shown in FIG. 17 can be altered to those shown in FIG. 9 using the luminance signal Xy which is not scale-adjusted (namely, C=0 and G=1). Also, the look-up tables shown in FIG. 19 can be modified as those shown in FIG. 10 using the luminance signal Xy which is not scale-adjusted. In both the cases, the functions of the modified look-up tables slope gently, resulting in the resolvement of the problem caused by the discrete values in the look-up tables.

Figures 11A, 11C:
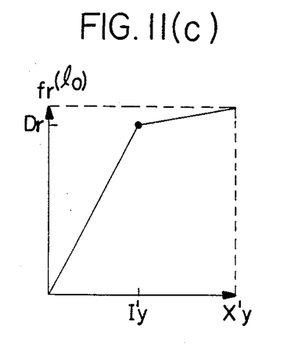
Figure 11B:
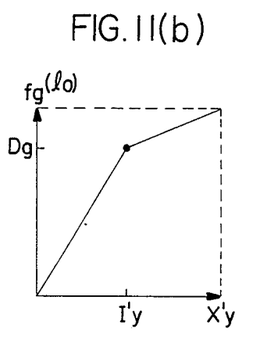
Figure 11C:
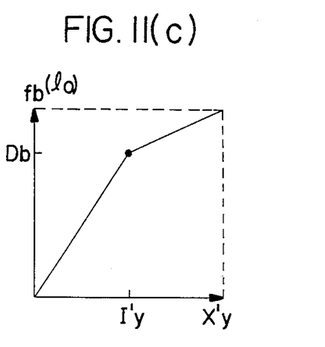
Figure 12A:
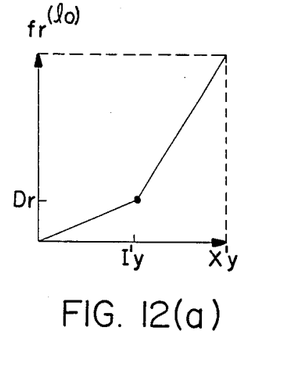
Figure 12B:
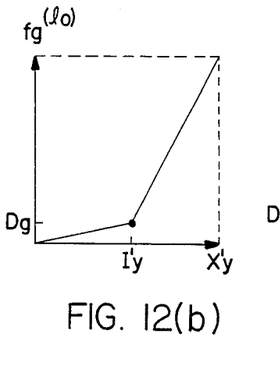
Figure 12C:
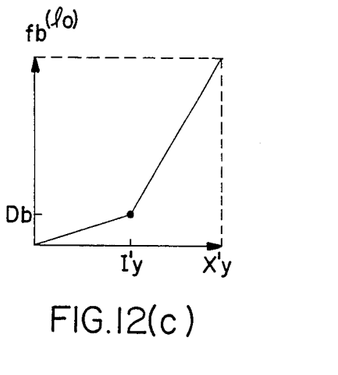

In the look-up tables shown in FIG. 20, the luminance signal Iy of the reference color has a value close to the lower limit. In this case, hence, the luminance signal Xy is amplified while setting the gain G to four and the fixed value C to zero (G=4 and C=0). By using the scale-adjusted luminance signal X'y, the look-up tables shown in FIG. 20 can be altered to those shown in FIG. 11. On the other hand, in the look-up tables shown in FIG. 21, the luminance signal Iy of the reference color has a value close to the upper limit. The look-up tables shown in FIG. 20 can be altered to those shown in FIG. 11 by using the scale-adjusted luminance signal X'y which is obtained by setting C=0.57 x Fi and G=2.3.

Also in these cases, the functions of the modified look-up tables slope gently, resulting in the resolvement of the problem caused by the discrete values in the look-up table.

FIG. 8 illustrates an example of the hardware for performing the above-mentioned processes. The hardware of FIG. 8 comprises multipliers 105 to 107 and an adder 108 which calculate the luminance signal Xy according to the NTSC system from the color components Xr, Xg, Xb supplied through terminals 101, 102, 103.

In accordance with the luminance signal Iy of the reference color, the microprocessor 202 (FIG. 13) calculates the gain G and constant C, using the equations (4) or (6) and (8). The constant C and gain G are supplied to registers 146 and 147 via terminals 141 and 142, and set in the registers by strobe signals ST1 and ST2 supplied to terminals 143 and 144. The luminance signal Xy which is the output of the adder 108 is supplied to a subtracter 110 in which the value stored in the register 146 is subtracted from the luminance signal Xy. A multiplier 111 multiplies the output of the subtracter 110 by the value stored in the register 147. That output of the multiplier 111 is connected to an overflow detector 115. The output level of the overflow detector 115 varies in accordance with the level of the output of the multiplier 111. That is, the level of the output of the multiplier 111 is "0" when the output of the multiplier 111 is negative, is equal to the upper limit Fi when the output cf the multiplier 111 is larger than the upper limit Fi, or is equal to the level of the output of the multiplier 111 in the case other than the above two cases.

Gates 121, 122 and 123 are controlled by control signals Sr, Sg and Sb, respectively, to select either of the R, G, B components or the scale-adjusted luminance signal X'y. The control signals Sr, Sg and Sb are supplied from selection circuits 131, 132 and 133. When a color component satisfies the inequalities (1), the microprocessor 202 (FIG. 13) produces a corresponding control signal $Sr^{(l)}$, $Sg^{(l)}$ or $Sb^{(l)}$ which is supplied to the selection circuit 131, 132 or 133 via a terminal 135, 136 or 137 to be set in an internal register of the selection circuit.

According to this example, the contents of the look-up tables are modified as shown in FIGS. 9 to 12. The signals passing through the gates 121 to 123 are supplied as address signals to look-up tables 151 to 153. The contents of the look-up tables 151 to 153 are read out to be supplied as the outputs $fr^{(lo)}$, $fg^{(lo)}$, $fb^{(lo)}$ through terminals 154 to 156.

In the foregoing description, the case in which a color change is carried out with a set of four different selections of label information is described as an example. The present invention is not limited to such a case, but applicable also in other cases, for example, when five or more sets of label information is inputted, or when no label information is inputted.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An image processing system comprising:
   image memory means for storing intensity information indicative of the color component of pixels constituting an image;
   calculating means for calculating modified intensity information from intensity information of two or more adjacently disposed color components read out from said image memory means;
   selecting means for selecting said modified intensity information or said intensity information read out from said image memory means;
   gate means for outputting said modified intensity information or said intensity information in accordance with the selection executed by said selecting means;
   look-up table memory means, receiving said modified intensity information or said intensity information outputted from said gate means, for adjusting the color of said modified intensity information or said intensity information to color converted intensity information, and for outputting said color converted intensity information; and
   display means for displaying an image on the basis of said color converted intensity information outputted from said look-up table memory means.

2. An image processing system according to claim 1, wherein said color selecting means selects
   (a) said modified intensity information in the event that an absolute value of a differential coefficient of a preselected function stored in said look-up table memory means is less than a first predetermined threshold which is close to zero, or greater than a second predetermined threshold which is greater than said first predetermined threshold, and
   (b) said intensity information of said color components otherwise.

3. An image processing system according to claim 1, wherein said modified intensity information is a mean value of intensity information of all of said color components.

4. An image processing system according to claim 1, wherein said modified intensity information is a mean value of intensity information of said color components other than the color component for which said modified intensity information is to be calculated.

5. An image processing system according to claim 1, wherein said modified intensity information is equal to a luminance signal of the National Television System Committee system.

6. An image processing system according to claim 1, wherein said calculating means calculates further-modified intensity information from said modified intensity information when said modified intensity information is close to a predetermined lower limit or a predetermined upper limit of the intensity range of said look-up table memory means.

7. An image processing system according to claim 6, wherein said further-modified intensity information is obtained by subtracting a predetermined value from said modified intensity information and then multiplying said subtracted modified intensity information by a fixed value which is greater than one.

8. An image processing method of changing the color of an original image comprising the steps of:
   storing intensity information of color components of pixels constituting said original image;
   calculating modified intensity information from two or more color components of said stored intensity information;
   selecting said modified intensity information or said stored intensity information;
   outputting said modified intensity information or said stored intensity information in accordance with the selection executed during said selecting step;
   adjusting the color of said modified intensity information or said stored intensity information, outputted in accordance with said selection, into color converted intensity information; and
   displaying a color converted image on the basis of said color converted intensity information so that the color change occurs while shades of the original image are maintained in the converted color image.

9. An image processing method of changing the color of an original image according to claim 8 wherein said selecting step further comprises selecting:
   (a) said modified intensity information in the event that an absolute value of a differential coefficient of a stored predetermined function is less than a first predetermined threshold which is close to zero, or greater than a second predetermined threshold which is greater than said first predetermined threshold, and
   (b) said intensity information of said color components otherwise.

10. An image processing method of changing the color of an original image according to claim 8 wherein said modified intensity information is a mean value of intensity information of all of said color components.

11. An image processing method of changing the color of an original image according to claim 8 wherein said modified intensity information is a mean value of intensity information of said color components other than the color component for which said modified intensity information is to be calculated.

12. An image processing method of changing the color of an image according to claim 8 wherein said modified intensity information is equal to a luminance signal of the National Television System Committee system.

13. An image processing method of changing the color of an image according to claim 8 wherein said calculating step further comprises calculating further-modified intensity information from said modified intensity information when said modified intensity information is close to a predetermined lower limit or a predetermined upper limit of an acceptable intensity range.

14. An image processing method of changing the color of an image according to claim 13 wherein said further-modified intensity information is obtained by subtracting a predetermined value from said modified intensity information and then multiplying said subtracted modified intensity information by a fixed value which is greater than one.

15. An image processor for changing the color of an area of an original image in order to develop a color converted image in which shades of the original image are maintained, said image processor comprising:
   image memory means for storing intensity information of color components of the original image;
   calculating means for calculating modified intensity information from said stored intensity information;

gating means for outputting said stored intensity information or said modified intensity information in accordance with a control signal;

look-up table means for adjusting the output of said gating means into color converted intensity information; and display means for displaying said color converted image on the basis of said color converted intensity information.

16. The image processor of claim 15 further comprising a selecting means for proving said control signal.

* * * * *